(12) United States Patent
Zhang et al.

(10) Patent No.: US 10,936,770 B2
(45) Date of Patent: Mar. 2, 2021

(54) METHOD FOR ADAPTIVELY ADJUSTING CONTROL PARAMETERS OF BBMC-BASED SPEED REGULATION SYSTEM OF ASYNCHRONOUS MOTOR

(71) Applicant: HUNAN UNIVERSITY OF SCIENCE AND TECHNOLOGY, Xiangtan (CN)

(72) Inventors: Xiaoping Zhang, Hunan (CN); Ji Liu, Hunan (CN)

(73) Assignee: Hunan University of Science and Technology, Xiangtan (CN)

( * ) Notice: Subject to any disclaimer, the term of this patent is extended or adjusted under 35 U.S.C. 154(b) by 0 days.

(21) Appl. No.: 16/909,753

(22) Filed: Jun. 23, 2020

(65) Prior Publication Data
US 2020/0320234 A1  Oct. 8, 2020

Related U.S. Application Data

(63) Continuation of application No. PCT/CN2019/098333, filed on Jul. 30, 2019.

(30) Foreign Application Priority Data

Mar. 7, 2019 (CN) .......................... 201910171144.6

(51) Int. Cl.
*G06F 30/20* (2020.01)
*G05B 13/04* (2006.01)
(Continued)

(52) U.S. Cl.
CPC ........... *G06F 30/20* (2020.01); *G05B 13/042* (2013.01); *H02M 3/1582* (2013.01); *G06F 2111/10* (2020.01)

(58) Field of Classification Search
CPC .. G06F 30/20; G06F 2111/10; H02M 3/1582; G05B 13/042
See application file for complete search history.

(56) References Cited

U.S. PATENT DOCUMENTS 8,217,616 B2 * 7/2012 Rozman ................. H02P 27/06
318/712
2014/0265945 A1 * 9/2014 Deboy .................... B60L 58/10
318/139

(Continued)

FOREIGN PATENT DOCUMENTS

CN      1801569 A     7/2006
CN    104980069 A    10/2015
(Continued)

*Primary Examiner* — Rehana Perveen
*Assistant Examiner* — Steven W Crabb
(74) *Attorney, Agent, or Firm* — Wayne & Ken, LLC

(57) ABSTRACT

A mathematical model between the optimization objects and the optimization objectives is established, with finite-time control parameters as optimization objects, and a total harmonic distortion of an output voltage, a deviation signal of a capacitor voltage and a deviation signal of an output current of BBMC as optimization objectives. A multi-objective optimization satisfaction function and a multi-objective optimization fitness function are established. Multiple sets of optimal finite-time control parameters are iteratively optimized using an adaptive wolf pack algorithm. Functional relationships between respective optimal finite-time control parameters and the corresponding actual output current of BBMC are obtained using a numerical fitting method. Optimal control parameters corresponding to any load are obtained according to the obtained functional relationships. Therefore, the control parameters are adjusted in real time according to the functional relationships and the load of the BBMC-based speed regulation system or the actual output current of BBMC.

2 Claims, 5 Drawing Sheets

(51) Int. Cl.
*H02M 3/158* (2006.01)
*G06F 111/10* (2020.01)

(56) References Cited

U.S. PATENT DOCUMENTS

2018/0226879 A1\*  8/2018  Wang ...................... H02M 1/08
2019/0138886 A1\*  5/2019  Allmaras ............. G05B 13/027
2020/0052575 A1\*  2/2020  Wang ...................... H02M 7/21

FOREIGN PATENT DOCUMENTS

| CN | 107070254 A | 8/2017 |
| CN | 107863910 A | 3/2018 |
| EP | 3073634 A1 | 9/2016 |

\* cited by examiner

METHOD FOR ADAPTIVELY ADJUSTING CONTROL PARAMETERS OF BBMC-BASED SPEED REGULATION SYSTEM OF ASYNCHRONOUS MOTOR

CROSS-REFERENCE TO RELATED APPLICATIONS

This application is a continuation of International Application No. PCT/CN2019/098333 with a filling date of Jul. 30, 2019, which claims the benefit of priority from Chinese Patent Application No. 201910171144.6 with a filing date of Mar. 7, 2019. The content of the aforementioned applications, including any intervening amendments thereto, are incorporated herein by reference.

TECHNICAL FIELD

The present application relates to power electronics, and more particularly to a method for adaptively adjusting control parameters of a BBMC-based speed regulation system of an asynchronous motor.

BACKGROUND

As a novel power converter, a Buck-Boost matrix converter (BBMC) has a high voltage transfer ratio and is capable of directly outputting high-quality sine waves, which is applicable for speed regulation systems of asynchronous motors. However, research shows that, in the BBMC-based speed regulation system of the asynchronous motor, control parameters of the speed regulation system of the asynchronous motor are required to be optimized as the load of the BBMC-based speed regulation system changes, so that indicators such as the total harmonic distortion of the output voltage in the BBMC achieve an optimal collaboration, thereby achieving a high-performance speed regulation for the speed regulation system.

Therefore, it is of great significance to determine optimal control parameters according to the magnitude of the load (i.e, magnitude of an actual output current of the BBMC), and further study a change law between the optimal control parameters and the actual output current of the BBMC, so that the relevant control parameters are adjusted in real time according to the load changes, thereby realizing the high-performance speed regulation.

SUMMARY

In order to solve the above-mentioned technical problems, the present disclosure provides a method for adaptively adjusting control parameters of a BBMC-based speed regulation system of an asynchronous motor with a high precision and good operation effect.

The technical solutions of the disclosure are described as follows.

The present disclosure provides a method for adaptively adjusting control parameters of a BBMC-based speed regulation system of an asynchronous motor, comprising:

(1) taking finite-time control parameters as optimization objects, a total harmonic distortion of an output voltage of a BBMC, a deviation signal of a capacitor voltage of the BBMC and a deviation signal of an output current of the BBMC as optimization objectives, establishing a mathematical model between the optimization objects and the optimization objectives for the BBMC-based speed regulation system of the asynchronous motor;

(2) selecting a load to allow an actual output current of the BBMC to be a certain value; and establishing a multi-objective optimization satisfaction function and a multi-objective optimization fitness function for the BBMC-based speed regulation system;

(3) iteratively optimizing the finite-time control parameters using an adaptive wolf pack optimization algorithm, so that an optimal collaboration among the total harmonic distortion of the output voltage of the BBMC, the deviation signal of the capacitor voltage and the deviation signal of the output current is obtained, thereby obtaining a set of optimal finite-time control parameters; adjusting the actual output current of the BBMC and repeating the step (2) and the step (3) to obtain n sets of optimal finite-time control parameters; and (4) obtaining functional relationships between the optimal finite-time control parameters and the corresponding actual output current of the BBMC using a numerical fitting method according to the obtained n sets of optimal finite-time control parameters and the corresponding actual output currents of the BBMC; and determining the optimal finite-time control parameters corresponding to any load of the BBMC-based speed regulation system according to the obtained functional relationships.

In an embodiment, the mathematical model between the optimization objects and the optimization objectives is established through steps of:

(1.1) taking a capacitor voltage $u_C$, an inductor current $i_L$ and an output current $i_l$ as control variables of the BBMC-based speed regulation system, establishing a state differential function of the BBMC-based speed regulation system as follows:

$$\begin{cases} \dot{i}_L = -\dfrac{u_C}{L} + \dfrac{u_C + u_D}{L} d \\ \dot{u}_C = \dfrac{i_L}{C} - \dfrac{i_l}{C} - \dfrac{i_L}{C} d \\ \dot{i}_1 = \dfrac{i_1 R}{L_1} - \dfrac{u_C}{L_1} + \dfrac{u_{DZ}}{L_1} \end{cases} \quad (1)$$

wherein $u_C$ is the capacitor voltage; $i_L$ is the inductor current; $i_l$ is the output current of the BBMC; $u_D$ is the voltage in a DC side of the BBMC; $u_{DZ}$ is the voltage in a common terminal of the single-phase stator windings of the asynchronous motor; L and C are respectively the inductance parameter and the capacitance parameter at an inverter side of the BBMC; R and $L_1$ are respectively the equivalent resistance and the equivalent inductance of the single-phase stator windings of the asynchronous motor; and d is the duty cycle of a power switch tube in the BBMC;

(1.2) obtaining an equation of the duty cycle d of the power switch tube in the BBMC according to the equation (1) and a finite-time control algorithm:

$$d = \dfrac{CL_1 u_0(L(-K_1(sat_{\alpha_1}(\lambda_1) + \lambda_1) - K_2(sat_{\alpha_2}(\lambda_2) + \lambda_2)) + u_C u_D) + L_1 L_1^2 u_C + CLu_D(u_C + u_D)(Ri_1 - u_C + u_{DZ})}{CL_1(u_C + u_D)(u_D^2 + i_L^2)}; \quad (2)$$

wherein sat is the saturation function; $\lambda_1 = (Li_L^2 + C(u_C + u_D)^2 - Li_{L_{ref}}^2 - C(u_{C_{ref}} + u_D)^2)/2$; $\lambda_2 = u_D i_L - (u_C - u_D) i_l - u_D i_{L_{ref}} + (u_{C_{ref}} + u_D) i_{l_{ref}}$; $u_{Cref}$ is the reference value of the capacitor voltage; $i_{Lref}$ is the reference value of the inductor current;

$i_{lref}$ is the reference value of the output current in the BBMC; $K_1$, $K_2$, $\alpha_1$ and $\alpha_2$ are the finite-time control parameters; and $\alpha_2 = 2\alpha_1/(1+\alpha_1)$;

(1.3) respectively obtaining analytical equations of the output voltage u and the output current $i_l$ according to the equation (1):

$$u = \left(\exp\left(\ln\sqrt{\frac{R^2C - 4L_1}{4L_1LC}} + \frac{R}{2}\sqrt{\frac{R^2C + 4L_1}{4L_1^2C}}\right) + (1-d)Ri_L\right) \tag{3}$$
$$\left(\cos\left(\sqrt{\frac{R^2C + 4L_1}{4RL_1LC}}t\right) + \sqrt{\frac{R^2C + 4L_i}{L_1^2C}}\sin\left(\sqrt{\frac{R^2C + 4L_1}{4RL_1LC}}t\right)\right),$$

$$i_1 = \left(\exp\left(\ln(2C^2(1-d)i_L) + \frac{1}{2C}\sqrt{\frac{4}{L_1C} + \frac{R^2}{L_1^2}} + \frac{R}{L_1}\right)\right) \tag{4}$$
$$\left(\frac{R}{L_1}\cos\left(\sqrt{\frac{4}{L_1C} + \frac{R^2}{L_1^2}}t\right) + \sin\left(\sqrt{\frac{4}{L_1C} + \frac{R^2}{L_1^2}}t\right)\right);$$

(1.4) obtaining the total harmonic distortion THD of the output voltage u according to a definition of the total harmonic distortion:

$$THD = \frac{\sqrt{\begin{array}{l}(\exp(TH+G) - 2\omega KRi_Ld + (R+L_1H)/(8L_1\omega^2))^2 + \\ (\exp(TH+G) - 3\omega KRi_Ld - (R+L_1H)/(16L_1\omega^2))^2\end{array}}}{\exp(TH+G) - \omega KRi_Ld - (R+L_1H)/(2L_1\omega^2)}; \tag{5}$$

wherein $$H = \sqrt{\frac{R^2C + 4L_1}{L_1^2C}}, \quad K = \sqrt{\frac{R^2C - 4L_1}{4L_1LC}},$$

G=ln(R/2), T is the period of the output voltage of the BBMC; and $\omega$ is the angular frequency of the output voltage; and (1.5) respectively obtaining a deviation $\Delta u_c$ between the capacitor voltage $u_c$ and an ideal voltage value $U_e$ under a load and a deviation $\Delta i$ between the output current $i_l$ and an ideal current $I_e$ under a load according to the analytical equations of the output voltage u and the output current $i_l$ obtained from the equation (3) and the equation (4):

$$\Delta u_c = u_c - U_e = \tag{6}$$
$$\left(\exp\left(\ln\sqrt{\frac{R^2C - 4L_1}{4L_1LC}} + \frac{R}{2} - \sqrt{\frac{R^2C + 4L_1}{4L_1^2C}}\right) + (1-d)Ri_L\right)$$
$$\left(\cos\left(\sqrt{\frac{R^2C + 4L_1}{4RL_1LC}}t\right) + \sqrt{\frac{R^2C + 4L_i}{L_1^2C}}\sin\left(\sqrt{\frac{R^2C + 4L_1}{4RL_1LC}}t\right)\right) +$$
$$U_{DZ} - Ue,$$

$$\Delta i = i_1 - I_e = \left(\exp\left(\ln(2C^2(1-d)i_L) + \frac{1}{2C}\sqrt{\frac{4}{L_1C} + \frac{R^2}{L_1^2}} + \frac{R}{L_1}\right)\right) \tag{7}$$
$$\left(\frac{R}{L_1}\cos\left(\sqrt{\frac{4}{L_1C} + \frac{R^2}{L_1^2}}t\right) + \sin\left(\sqrt{\frac{4}{L_1C} + \frac{R^2}{L_1^2}}t\right)\right) - I_e.$$

In an embodiment, the multi-objective optimization satisfaction function is established through steps of:

(2.1.1) respectively establishing satisfaction functions of optimization objectives THD, $\Delta u_C$ and $\Delta i$, wherein a satisfaction function $f_1$ of an optimization objective THD is expressed as shown in equation (8):

$$f_1 \begin{cases} 1 & THD \leq THD' \\ \dfrac{c_1}{\sqrt{(THD - THD')}} & THD > THD' \end{cases} \tag{8}$$

a satisfaction function $f_2$ of an optimization objective $\Delta u_C$ is expressed as shown in equation (9):

$$f_2 = \begin{cases} 1 & \Delta u_C \leq \Delta u'_C \\ \dfrac{c_2}{\sqrt{(\Delta u_C - \Delta u'_C)}} & \Delta u_C > \Delta u'_C \end{cases} \tag{9}$$

a satisfaction functions $f_3$ of an optimization objective $\Delta i$ is expressed as shown in equation (10):

$$f_3 = \begin{cases} 1 & \Delta i \leq \Delta i' \\ \dfrac{c_3}{\sqrt{(\Delta i - \Delta i')}} & \Delta i > \Delta i' \end{cases} \tag{10}$$

wherein THD', $\Delta u_C$' and $\Delta i$' are respectively thresholds of the optimization objectives THD, $\Delta u_C$ and $\Delta i$; $c_1$, $c_2$ and $c_3$ are coefficients of satisfaction, wherein $c_1 > 0$, $c_2 > 0$ and $c_3 > 0$; and (2.1.2) establishing the multi-objective optimization satisfaction function $f$ of the optimization objectives THD, $\Delta u_C$ and $\Delta i$ as shown in equation (11):

$$f = k_1 f_1 + k_2 f_2 + k_3 f_3 \tag{11};$$

wherein $k$, $k_2$ and $k_3$ are respectively weight coefficients of the optimization objectives THD, $\Delta u_C$ and $\Delta i$; and $k_1 + k_2 + k_3 = 1$; and the multi-objective optimization fitness function is established through steps of:

(2.2.1) comparing satisfaction values of the optimization objectives with corresponding satisfaction thresholds; if a satisfaction value $f_j$ (j=1, 2, 3) of each of the optimization objectives is smaller than a corresponding satisfaction threshold $M_j$ (j=1, 2, 3), the satisfaction value $f_j$ (j=1, 2, 3) is multiplied by a dynamic penalty factor $b_j$, wherein the satisfaction thresholds are respectively $$M_1 = \left|\frac{THD - THD'}{THD}\right|, \quad M_2 = \left|\frac{\Delta u_C - \Delta u'_C}{\Delta u_C}\right| \text{ and}$$

$$M_3 = \left|\frac{\Delta i - \Delta i'}{\Delta i}\right|;$$

and the corresponding dynamic penalty factors are respectively $$b_1 = \log_{\frac{1}{2}}\left(\left|\frac{THD - THD'}{THD}\right|\right), \quad b_2 = \log_{\frac{1}{2}}\left(\left|\frac{\Delta u_C - \Delta u'_C}{\Delta u_C}\right|\right) \text{ and}$$

$$b_3 = \log_{\frac{1}{2}}\left(\left|\frac{\Delta i - \Delta i'}{\Delta i}\right|\right);$$

otherwise, if the satisfaction value $f_j$ (j=1, 2, 3) of each of the optimization objectives is greater than or equal to the corresponding satisfaction threshold $M_j$ (j=1, 2, 3), setting the dynamic penalty factor $b_j$ as 1;

(2.2.2) establishing the multi-objective optimization fitness function $f_s$ as shown in equation (12):

$$f_s = k_1 b_1 f_1 + k_2 b_2 f_2 + k_3 b_3 f_3 \quad (12).$$

In an embodiment, the finite-time control parameters in the BBMC are iteratively optimized using the adaptive wolf pack optimization algorithm through steps of:

(3.1) taking the selected actual output current of the BBMC as a judgment reference value of the adaptive wolf pack optimization algorithm;

(3.2) initializing parameters, wherein the parameters comprise: population size N representing N sets of the finite-time control parameters, the maximum number $k_{max}$ of iterations and the multi-objective optimization fitness function $f_s$ representing a concentration S(i) of prey's smell of a wolf pack;

(3.3) configuring a random direction and a random distance of wolves in the wolf pack and obtaining a position Xi ($K_1$, $K_2$, $\alpha_1$) of the i-th wolf;

(3.4) obtaining the concentration of prey's smell of the wolf pack to obtain a set of the optimization objects; and obtaining the corresponding THD, $\Delta u_C$ and $\Delta i$ according to the optimization objects;

(3.5) identifying a wolf with the highest concentration of prey's smell in the wolf pack as an optimal wolf, and retaining the concentration of prey's smell and position $X_m$($K_1$, $K_2$, $\alpha_1$) of the optimal wolf;

(3.6) eliminating N/10 wolves in the wolf pack with a small concentration of prey's smell, and randomly generating the same number of new wolves in a solution space to update the wolf pack;

(3.7) determining whether the maximum number of iterations is reached; if yes, outputting the position $X_m$ ($K_1$, $K_2$, $\alpha_1$) of the optimal wolf to output an optimal solution of the finite-time control parameters $K_1$, $K_2$ and $\alpha_1$; otherwise, adding 1 to the number of iterations, and returning to the step (3.3);

(3.8) determining whether n sets of optimal finite-time control parameters are obtained; if no, changing the actual output current of the BBMC at a certain interval, and returning to the step (3.1); and (3.9) outputting the n sets of optimal finite-time control parameters and the corresponding actual output currents of the BBMC.

In an embodiment, in the step (4), the numerical fitting method is a least square method; the functional relationships comprise a functional relationship between an optimal finite-time control parameter $K_1$ and the actual output current i of the BBMC, a functional relationship between an optimal finite-time control parameter $K_2$ and the actual output current i of the BBMC, and a functional relationship between an optimal finite-time control parameter $\alpha_1$ and the actual output current i of the BBMC;

wherein the functional relationship between the optimal finite-time control parameter $K_1$ and the actual output current i of the BBMC is expressed as shown in equation (13):

$$f_{K1}(i) = A_1 i^4 + A_2 i^3 + A_3 i^2 + A_4 i + A_5 \quad (13);$$

the functional relationship between the optimal finite-time control parameter $K_2$ and the actual output current i of the BBMC is expressed as shown in equation (14):

$$f_{K2}(i) = B_1 i^4 + B_2 i^3 + B_3 i^2 + B_4 i + B_5 \quad (14);$$

the functional relationship between the optimal finite-time control parameter $\alpha_1$ and the actual output current i of the BBMC is expressed as shown in equation (15):

$$f_{\alpha 1}(i) = C_1 \exp(-((i-C_2)/C_3)^2) + C_4 \exp(-((i-C_5)/C_6)^2) + C_7 \exp(-((i-C_8)/C_9)^2) + C_{10} \exp(-((i-C_{11})^2) + C_{13} \exp(-((i-C_{14})/C_{14})/C_{15})^2) \quad (15);$$

wherein $f_{K1}(i)$, $f_{K2}(i)$ and $f_{\alpha 1}(i)$ are respectively functions of the optimal finite-time control parameters $K_1$, $K_2$ and $\alpha_1$; $A_1, A_2, A_3, A_4$ and $A_5$ are respectively coefficients of $f_{K1}(i)$; $B_1, B_2, B_3, B_4$ and $B_5$ are respectively coefficients of $f_{K2}(i)$; $C_1, C_2, C_3, C_4, C_5, C_6, C_7, C_8, C_9, C_{10}, C_{11}, C_{12}, C_{13}, C_{14}$ and $C_{15}$ are respectively coefficients of $f_{\alpha 1}(i)$; and the coefficients are obtained using a Matlab™ analysis software according to the least square method; and the optimal finite-time control parameters corresponding to any load of the BBMC-based speed regulation system are determined according to the obtained functional relationships.

The disclosure has the following beneficial effects.

The present disclosure provides a method for adaptively adjusting control parameters of a BBMC-based speed regulation system of an asynchronous motor, in which the BBMC-based speed regulation system of the asynchronous motor is adopted as a frequency converter, which is controlled by a finite-time control algorithm. Firstly, taking finite-time control parameters as optimization objects, and a total harmonic distortion THD of an output voltage, the deviation signal $\Delta u_c$ of the capacitor voltage and the deviation signal $\Delta i$ of output current as optimization objectives, a mathematical model between the optimization objects and the optimization objectives is established. Then, a load is selected to allow an actual output current of the BBMC to be a certain value, and a multi-objective optimization satisfaction function and a multi-objective optimization fitness function are established; a set of optimal finite-time control parameters are obtained using an adaptive wolf pack algorithm, and the actual output current of the BBMC is adjusted at a certain interval to obtain n sets of optimal finite-time control parameters. Finally, functional relationships between the optimal finite-tithe control parameters and the corresponding actual output current of the BBMC are obtained using a numerical fitting method. The control parameters are adjusted in real time according to the actual load of the speed regulation system, so that the speed regulation system achieves an optimal operation effect under any load.

DETAILED DESCRIPTION OF EMBODIMENTS

The present disclosure will be further described in detail below with reference to the accompanying drawings and embodiments.

Figure 1:
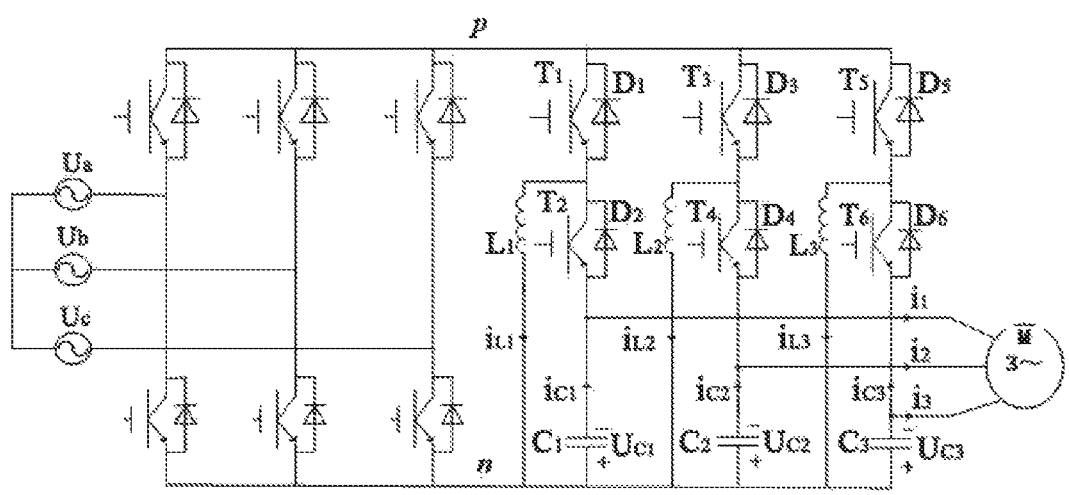
FIG. 1 shows a topology of a BBMC-based speed regulation system according to an embodiment of the present disclosure.

As shown in FIG. 1, provided is a topology of a speed regulation system according to the present disclosure, where a BBMC is adopted as a frequency converter, and a three-phase asynchronous motor is adopted as a load motor; the BBMC includes a rectifier side and an inverter side, where the rectifier side is a three-phase PWM rectifier circuit for rectifying three-phase AC voltage into PWM-modulated DC voltage; and the inverter side is a three-phase Buck-Boost inverter, which consists of three Buck-Boost DC/DC converters with the same structure.

Figure 2:
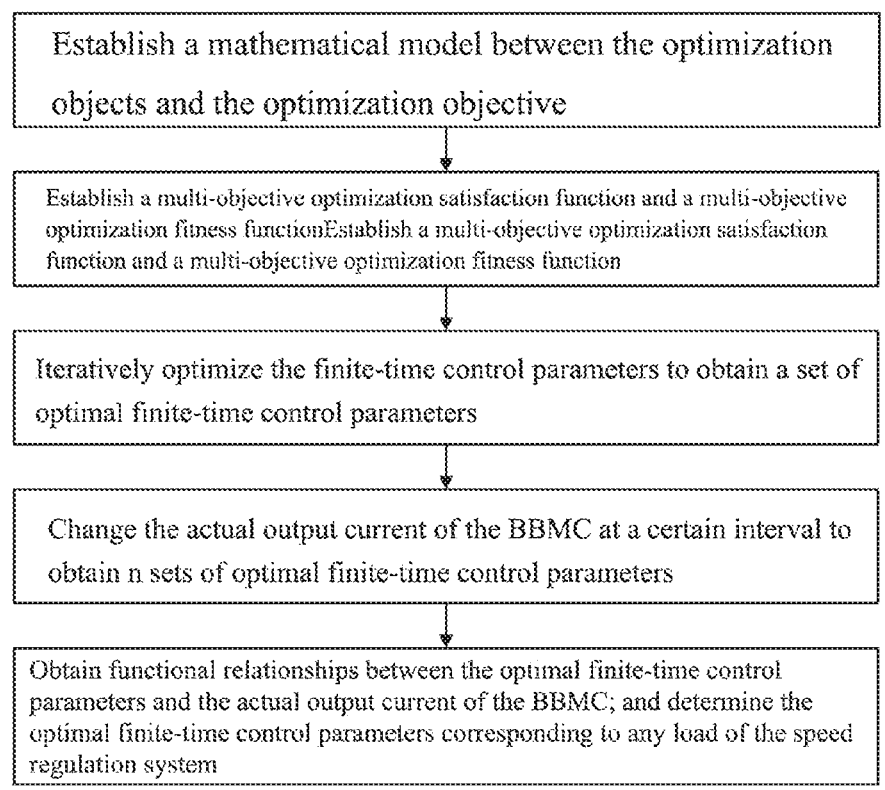
FIG. 2 is a flowchart of a method for adaptively adjusting control parameters of the BBMC-based speed regulation system of an asynchronous motor according to the present disclosure.

As shown in FIG. 2, provided is a flowchart of a method for adaptively adjusting control parameters of the BBMC-based speed regulation system of the asynchronous motor, including the following steps:

(1) taking finite-time control parameters as optimization objects, and a total harmonic distortion of an output voltage of the BBMC, a deviation signal of a capacitor voltage of the BBMC and a deviation signal of an output current of the BBMC as optimization objectives, a mathematical model between the optimization objects and the optimization objectives for the BBMC-based speed regulation system of the asynchronous motor is established;

where the mathematical model between the optimization objects and the optimization objectives is established through steps of:

(1.1) taking a capacitor voltage $u_c$, an inductor current $i_L$ and an output current $i_l$ as control variables of the speed regulation system, a state differential function of the speed regulation system is established as follows:

$$\begin{cases} \dot{i}_L = -\frac{u_C}{L} + \frac{u_C + u_D}{L} d \\ \dot{u}_C = \frac{i_L}{C} - \frac{i_1}{C} - \frac{i_L}{C} d \\ \dot{i}_1 = \frac{i_1 R}{L_1} - \frac{u_C}{L_1} + \frac{u_{DZ}}{1} \end{cases} \quad (1)$$

where $u_C$ is the capacitor voltage; $i_L$ is the inductor current; $i_l$ is the output current of the BBMC; $u_D$ is the voltage in a DC side of the BBMC; $u_{DZ}$ is the voltage in a common terminal of single-phase stator windings of the asynchronous motor; L and C are respectively the inductance parameter and the capacitance parameter at an inverter side of the BBMC; R and $L_1$ are respectively the equivalent resistance and the equivalent inductance of the single-phase stator windings of the asynchronous motor; and d is the duty cycle of a power switch tube in the BBMC;

(1.2) an equation of the duty cycle d of the power switch tube in the BBMC is obtained according to the equation (1) and a finite-time control algorithm:

$$d = \frac{CL_1 u_0(L(-K_1(sat_{\alpha_1}(\lambda_1) + \lambda_1) - K_2(sat_{\alpha_2}(\lambda_2) + \lambda_2)) + u_C u_D) +}{CL_1(u_C + u_D)(u_D^2 + i_L^2)}; \quad (2)$$

where sat is the saturation function; $\lambda_1 = (Li_L^2 + C(u_C+u_D)^2 - Li_{L_{ref}}^2 - C(u_{C_{ref}}+u_D)^2)/2$; $\lambda_2 = u_D i_L - (u_C+u_D)i_l - u_D i_{Lref} + (u_{Cref}+u_D)i_{lref}$; $u_{Cref}$ is the reference value of the capacitor voltage; $i_{Lref}$ is the reference value of the inductor current; $i_{lref}$ is the reference value of the output current in the BBMC; $K_1$, $K_2$, $\alpha_1$ and $\alpha_2$ are the finite-time control parameters; and $\alpha_2 = 2\alpha_1/(1+\alpha_1)$;

(1.3) analytical equations of the output voltage u and the output current $i_l$ are respectively obtained according to the equation (1):

$$u = \left(\exp\left(\ln\sqrt{\frac{R^2C - 4L_1}{4L_1 LC}} + \frac{R}{2}\sqrt{\frac{R^2C + 4L_1}{4L_1^2 C}}\right) + (1-d)Ri_L\right) \quad (3)$$
$$\left(\cos\left(\sqrt{\frac{R^2C + 4L_1}{4RL_1 LC}} t\right) + \sqrt{\frac{R^2C + 4L_i}{L_1^2 C}} \sin\left(\sqrt{\frac{R^2C + 4L_1}{4RL_1 LC}} t\right)\right),$$

$$i_1 = \left(\exp\left(\ln(2C^2(1-d)i_L) + \frac{1}{2C}\sqrt{\frac{4}{L_1 C} + \frac{R^2}{L_1^2}} + \frac{R}{L_1}\right)\right) \quad (4)$$
$$\left(\frac{R}{L_1}\cos\left(\sqrt{\frac{4}{L_1 C} + \frac{R^2}{L_1^2}} t\right) + \sin\left(\sqrt{\frac{4}{L_1 C} + \frac{R^2}{L_1^2}} t\right)\right);$$

(1.4) the total harmonic distortion THD of the output voltage u is obtained according to a definition of the total harmonic distortion:

$$THD = \frac{\sqrt{(\exp(TH+G) - 2\omega KRi_L d + (R+L_1 H)/(8L_1\omega^2))^2 + (\exp(TH+G) - 3\omega KRi_L d - (R+L_1 H)/(16L_1\omega^2))^2}}{\exp(TH+G) - \omega KRi_L d - (R+L_1 H)/(2L_1\omega^2)}, \quad (5)$$

where $$H = \sqrt{\frac{R^2C + 4L_1}{L_1^2 C}}, \quad K = \sqrt{\frac{R^2C - 4L_1}{4L_1 LC}},$$

G=ln(R/2), T is the period of the output voltage of the BBMC; and ω is the angular frequency of the output voltage; and (1.5) a deviation $\Delta u_c$ between the capacitor voltage $u_c$ and an ideal voltage value $U_e$ under a certain load and a deviation $\Delta i$ between the output current $i_l$ and an ideal current $I_e$ under a certain load are respectively obtained according to the analytical equations of the output voltage u and the output current $i_l$ obtained from the equation (3) and the equation (4):

$$\Delta u_c = u_c - U_e = \quad (6)$$
$$\left(\exp\left(\ln\sqrt{\frac{R^2C - 4L_1}{4L_1 LC}} + \frac{R}{2} - \sqrt{\frac{R^2C + 4L_1}{4L_1^2 C}}\right) + (1-d)Ri_L\right)$$
$$\left(\cos\left(\sqrt{\frac{R^2C + 4L_1}{4RL_1 LC}} t\right) + \sqrt{\frac{R^2C + 4L_i}{L_1^2 C}} \sin\left(\sqrt{\frac{R^2C + 4L_1}{4RL_1 LC}} t\right)\right) +$$
$$U_{DZ} - U_e,$$

$$\Delta i = i_1 - I_e = \left(\exp\left(\ln(2C^2(1-d)i_L) + \frac{1}{2C}\sqrt{\frac{4}{L_1 C} + \frac{R^2}{L_1^2}} + \frac{R}{L_1}\right)\right) \quad (7)$$
$$\left(\frac{R}{L_1}\cos\left(\sqrt{\frac{4}{L_1 C} + \frac{R^2}{L_1^2}} t\right) + \sin\left(\sqrt{\frac{4}{L_1 C} + \frac{R^2}{L_1^2}} t\right)\right) - I_e;$$

(2) a load with a certain magnitude is selected to allow an actual output current of the BBMC to be a certain value; and a multi-objective optimization satisfaction function and a multi-objective optimization fitness function for the speed regulation system are established;

(2.1) the multi-objective optimization satisfaction function is established through the following steps:

(2.1.1) satisfaction functions of optimization objectives THD, $\Delta u_C$ and $\Delta i$ are respectively established, where a satisfaction function $f_1$ of the optimization objective THD is expressed as shown in equation (8):

$$f_1 \begin{cases} 1 & THD \leq THD' \\ \dfrac{c_1}{\sqrt{(THD - THD')}} & THD > THD' \end{cases} \quad (8)$$

a satisfaction function $f_2$ of the optimization objective $\Delta u_C$ is expressed as shown in equation (9):

$$f_2 = \begin{cases} 1 & \Delta u_C \leq \Delta u'_C \\ \dfrac{c_2}{\sqrt{(\Delta u_C - \Delta u'_C)}} & \Delta u_C > \Delta u'_C \end{cases} \quad (9)$$

a satisfaction functions $f_3$ of the optimization objective $\Delta i$ is expressed as shown in equation (10):

$$f_3 = \begin{cases} 1 & \Delta i \leq \Delta i' \\ \dfrac{c_2}{\sqrt{(\Delta i - \Delta i')}} & \Delta i > \Delta i' \end{cases} \quad (10)$$

where THD', $\Delta u_C'$ and $\Delta i'$ are respectively thresholds of the optimization objectives THD, $\Delta u_C$ and $\Delta i$; $c_1$, $c_2$ and $c_3$ are coefficients of satisfaction, wherein $c_1 > 0$, $c_2 > 0$ and $c_3 > 0$; and (2.1.2) the multi-objective optimization satisfaction function $f$ of the optimization objectives THD, $\Delta u_C$ and $\Delta i$ is established as shown in equation (11):

$$f = k_1 f_1 + k_2 f_2 + k_3 f_3 \quad (11)$$

where $k_1$, $k_2$ and $k_3$ are respectively weight coefficients of the optimization objectives THD, $\Delta u_C$ and $\Delta i$; and $k_1 + k_2 + k_3 = 1$;

(2.2) the multi-objective optimization fitness function is established through steps of:

(2.2.1) a satisfaction value of each of the optimization objectives is compared with its corresponding satisfaction threshold; if a satisfaction value $f_j$ (j=1, 2, 3) of each of the optimization objectives is smaller than its corresponding satisfaction threshold $M_j$ (j=1, 2, 3), the satisfaction value $f_j$ (j=1, 2, 3) of each of the optimization objectives is multiplied by a corresponding dynamic penalty factor $b_j$, where the satisfaction thresholds are respectively $$M_1 = \left|\dfrac{THD - THD'}{THD}\right|, M_2 = \left|\dfrac{\Delta u_C - \Delta u'_C}{\Delta u_C}\right| \text{ and } M_3 = \left|\dfrac{\Delta i - \Delta i'}{\Delta i}\right|;$$

and the corresponding dynamic penalty factors are respectively $$b_1 = \log_{\frac{1}{2}}\left(\left|\dfrac{THD - THD'}{THD}\right|\right), b_2 = \log_{\frac{1}{2}}\left(\left|\dfrac{\Delta u_C - \Delta u'_C}{\Delta u_C}\right|\right) \text{ and}$$

$$b_3 = \log_{\frac{1}{2}}\left(\left|\dfrac{\Delta i - \Delta i'}{\Delta i}\right|\right);$$

otherwise, i.e., if the satisfaction value $f_j$ (j=1, 2, 3) of each of the optimization objectives is greater than or equal to its corresponding satisfaction threshold $M_j$ (j=1, 2, 3), the corresponding dynamic penalty factor $b_j$ is set as 1;

(2.2.2) the multi-objective optimization fitness function $f_s$ is established as shown in equation (12):

$$f_s = k_1 b_1 f_1 + k_2 b_2 f_2 + k_3 b_3 f_3 \quad (12)$$

(3) the finite-time control parameters are iteratively optimized using an adaptive wolf pack optimization algorithm, so that an optimal collaboration among the total harmonic distortion of the output voltage, the deviation signal of the capacitor voltage and the deviation signal of the output current is obtained, thereby obtaining a set of optimal finite-time control parameters; the actual output current of the BBMC is adjusted and the step (2) and the step (3) are repeated to obtain n sets of optimal finite-time control parameters.

Figure 3:
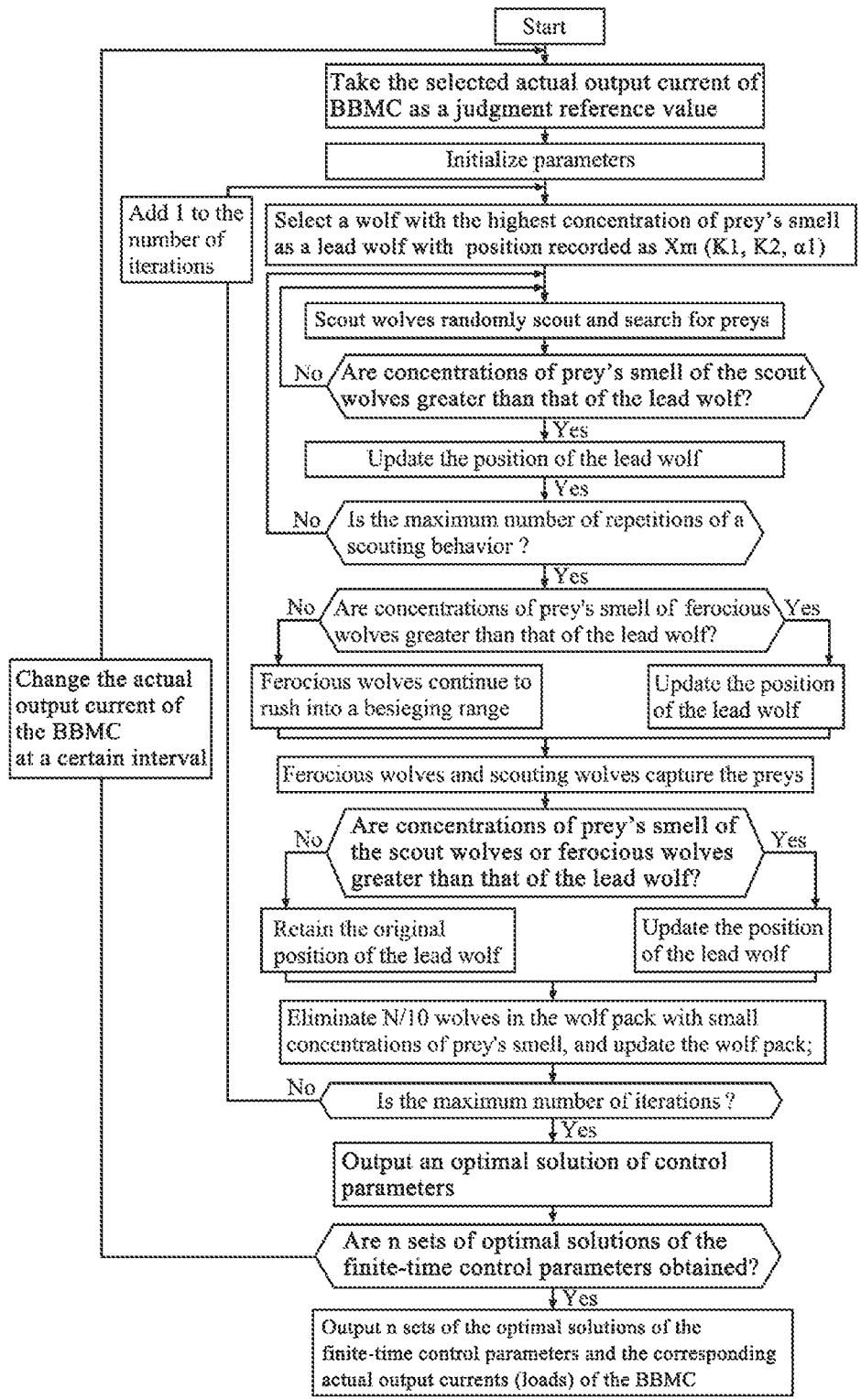
FIG. 3 is a flowchart of an adaptive wolf pack optimization algorithm according to the present disclosure.

Referring to FIG. 3, the finite-time control parameters in the BBMC are iteratively optimized by adopting the adaptive wolf pack optimization algorithm through the following steps:

(3.1) the selected actual output current of the BBMC is taken as a judgment reference value of the adaptive wolf pack optimization algorithm;

(3.2) parameters are initialized, where the parameters include: population size N representing N sets of the finite-time control parameters, the maximum number $k_{max}$ of iterations and the multi-objective optimization fitness function $f_s$ representing a concentration $S(i)$ of prey's smell of a wolf pack;

(3.3) a random direction and a random distance of wolves in the wolf pack are configured and a position $X_i$ ($K_1$, $K_2$, $\alpha_1$) of the i-th wolf is obtain;

(3.4) the concentration of prey's smell of the wolf pack is obtained to obtain a set of the optimization objects; and the corresponding THD, $\Delta u_C$ and $\Delta i$ are obtained according to the optimization objects;

(3.5) a wolf with the highest concentration of prey's smell in the wolf pack is identified as an optimal wolf, and the concentration of prey's smell and position $X_m$ ($K_1$, $K_2$, $\alpha_1$) of the optimal wolf are retained;

(3.6) N/10 wolves in the wolf pack with a small concentration of prey's smell are eliminated, and the same number of new wolves are randomly generated in a solution space to update the wolf pack;

(3.7) whether the maximum number of iterations is reached is determined; if yes, the position $X_m$ ($K_1$, $K_2$, $\alpha_1$) of the optimal wolf is outputted, i.e., an optimal solution of the finite-time control parameters $K_1$, $K_2$ and $\alpha_1$ are outputted; otherwise, 1 is added to the number of iterations, and the process is returned to step (3.3);

(3.8) whether n sets of optimal finite-time control parameters are obtained is determined; if no, the actual output current of the BBMC is changed at a certain interval, and the process is returned to the step (3.1); and (3.9) the n sets of optimal finite-time control parameters and the corresponding actual output currents of the BBMC are outputted.

(4) Functional relationships between the optimal finite time control parameters and the actual output current of the BBMC are obtained using a numerical fitting method according to the obtained n sets of optimal finite-time control parameters and the corresponding actual output currents of the BBMC; the numerical fitting method is a least square method; the functional relationships include a functional relationship between an optimal finite-time control parameter $K_1$ and the actual output current i of the BBMC, a functional relationship between an optimal finite-time control parameter $K_2$ and the actual output current i of the BBMC, and a functional relationship between an optimal finite-time control parameter $\alpha_1$ and the actual output current i of the BBMC;

where the functional relationship between the optimal finite-time control parameters $K_1$ and the actual output current i of the BBMC is expressed as shown in equation (13):

$$f_{K1}(i)=A_1 i^4+A_2 i^3+A_3 i^2+A_4 i+A_5 \quad (13);$$

the functional relationship between the optimal finite-time control parameters $K_2$ and the actual output current i of the BBMC is expressed as shown in equation (14):

$$f_{K2}(i)=B_1 i^4+B_2 i^3+B_3 i^2+B_4 i+B_5 \quad (14);$$

the functional relationship between the optimal finite-time control parameters $\alpha_1$ and the actual output current i of the BBMC is expressed as shown in equation (15):

$$f_{\alpha 1}(i)=C_1 \exp(-((i-C_2)/C_3)^2)+C_4 \exp(-((i-C_5)/C_6)^2)+ \\ C_7 \exp(-((i-C_8)/C_9)^2)+C_{10} \exp(-((i-C_{11})^2)+C_{13} \\ \exp(-((i-C_{14})/C_{15})^2) \quad (15);$$

where $f_{K1}(i)$, $f_{K2}(i)$ and $f_{\alpha 1}(i)$ are respectively functions of the optimal finite-time control parameters $K_1$, $K_2$ and $\alpha_1$; $A_1, A_2, A_3, A_4$ and $A_5$ are respectively coefficients of $f_{K1}(i)$; $B_1, B_2, B_3, B_4$ and $B_5$ are respectively coefficients of $f_{K2}(i)$; $C_1, C_2, C_3, C_4, C_5, C_6, C_7, C_8, C_9, C_{10}, C_{11}, C_{12}, C_{13}, C_{14}$ and $C_{15}$ are respectively coefficients of $f_{\alpha 1}(i)$; and the coefficients are obtained using a Matlab™ analysis software according to the least square method; and the optimal finite-time control parameters corresponding to any load of the speed regulation system are determined according to the obtained functional relationships.

Figure 4A:
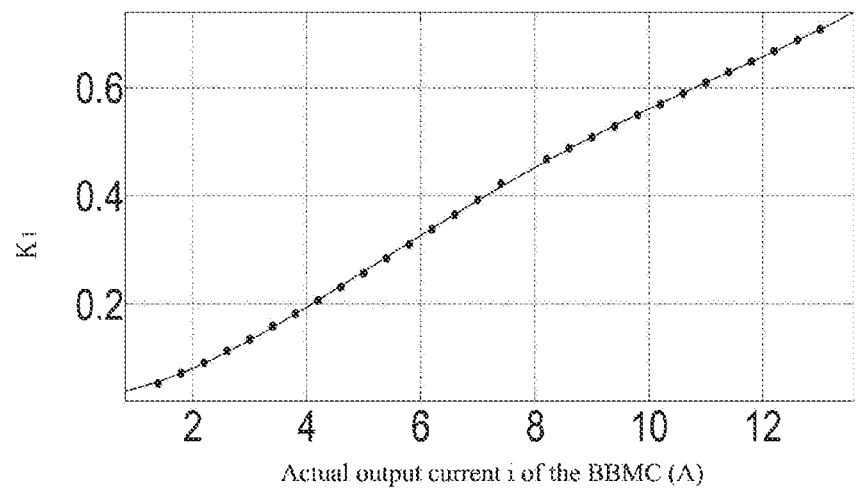
FIGS. 4A-C show curves of fitting functions of optimal finite-time control parameters according to the present disclosure.
Figure 4B:
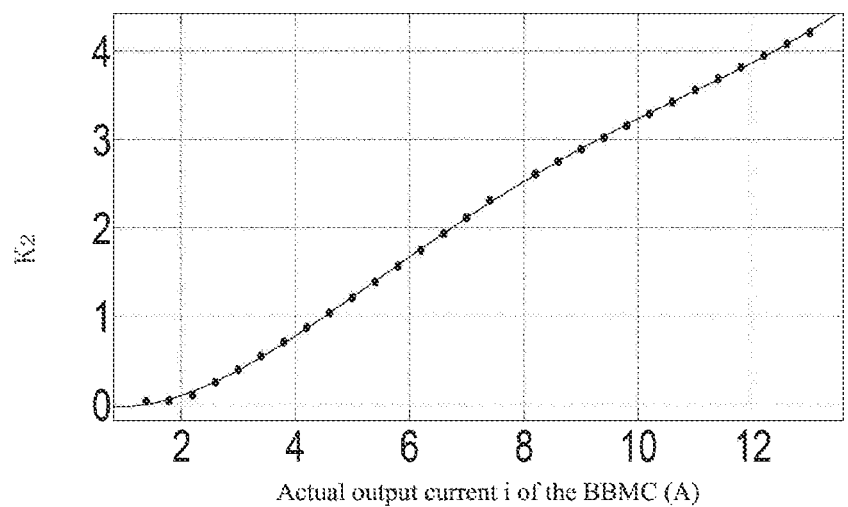
Figure 4C:
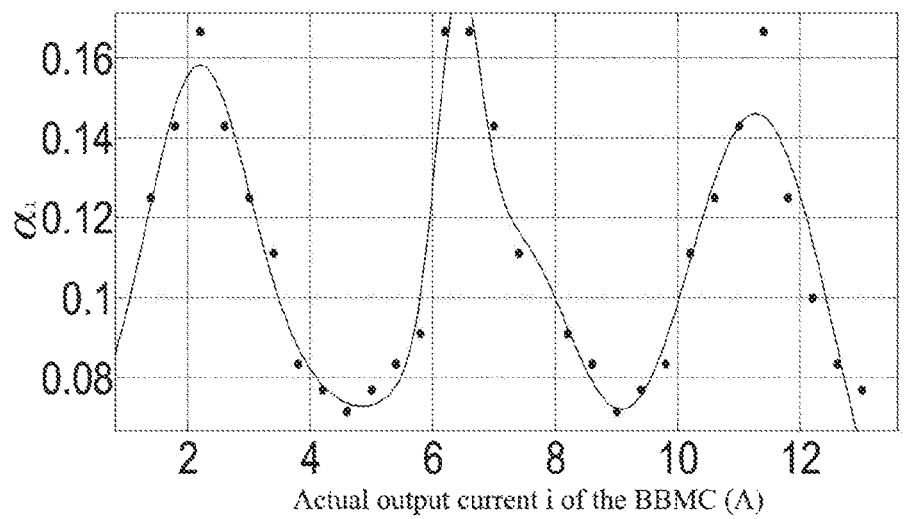

FIGS. 4A-C show curves of fitting functions of optimal finite-time control parameters according to the present disclosure. A rated power, a rated voltage, and a rated current of the speed regulation system are set as follows: $P_N$=15 kW, $U_N$=380 V, $I_N$=30.1 A. 30 sets of load data are taken at a certain interval within a range of the rated load of the speed regulation system, i.e., 30 output current data are selected at a certain interval within the range of the rated output current of the BBMC. For example, 30 output current data are selected by taking 1.4 A as an initial value and increasing with an interval of 0.4 A, and the optimal finite-time control parameters corresponding to each output current are calculated using the adaptive wolf pack algorithm, as as shown in Table 1:

TABLE 1

Output currents of the BBMC and the corresponding optimal finite-time control parameters

| Current/A | 1.4 | 1.8 | 2.2 | 2.6 | 3.0 |
|---|---|---|---|---|---|
| $K_1$ | 0.05331 | 0.07200 | 0.09193 | 0.11297 | 0.13500 |
| $K_2$ | 0.03554 | 0.04800 | 0.11288 | 0.25313 | 0.40003 |
| $\alpha_1$ | 0.12500 | 0.14285 | 0.16667 | 0.14285 | 0.12500 |

TABLE 1-continued

Output currents of the BBMC and the corresponding optimal finite-time control parameters

| Current/A | 3.4 | 3.8 | 4.2 | 4.6 | 5.0 |
|---|---|---|---|---|---|
| $K_1$ | 0.15794 | 0.18169 | 0.20619 | 0.23136 | 0.25715 |
| $K_2$ | 0.55294 | 0.71130 | 0.87460 | 1.04241 | 1.21435 |
| $\alpha_1$ | 0.11111 | 0.08333 | 0.07692 | 0.07142 | 0.07692 |
| Current/A | 5.4 | 5.8 | 6.2 | 6.6 | 7.0 |
| $K_1$ | 0.28351 | 0.31039 | 0.33775 | 0.36555 | 0.39376 |
| $K_2$ | 1.39007 | 1.56927 | 1.75167 | 1.93702 | 2.12511 |
| $\alpha_1$ | 0.08333 | 0.09090 | 0.16667 | 0.16667 | 0.14285 |
| Current/A | 7.4 | 7.8 | 8.2 | 8.6 | 9.0 |
| $K_1$ | 0.42235 | 0.44216 | 0.46770 | 0.48816 | 0.50852 |
| $K_2$ | 2.31573 | 2.49593 | 2.61804 | 2.75446 | 2.89015 |
| $\alpha_1$ | 0.11111 | 0.09090 | 0.08653 | 0.08142 | 0.07692 |
| Current/A | 9.4 | 9.8 | 10.2 | 10.6 | 11.0 |
| $K_1$ | 0.52877 | 0.54892 | 0.56899 | 0.58897 | 0.60887 |
| $K_2$ | 3.02515 | 3.15952 | 3.29329 | 3.42650 | 3.55919 |
| $\alpha_1$ | 0.07893 | 0.08111 | 0.11500 | 0.12285 | 0.14256 |
| Current/A | 11.4 | 11.8 | 12.2 | 12.6 | 13.0 |
| $K_1$ | 0.62870 | 0.64846 | 0.66815 | 0.68778 | 0.70735 |
| $K_2$ | 3.69137 | 3.82309 | 3.95436 | 4.08522 | 4.21568 |
| $\alpha_1$ | 0.16667 | 0.12500 | 0.10000 | 0.08142 | 0.07692 |

According to the 30 sets of output currents of the BBMC and the corresponding optimal finite-time control parameters obtained from Table 1, the corresponding functional relationships are obtained using the numerical fitting method; where the numerical fitting method is the least square method; the functional relationships include a functional relationship between the optimal finite-time control parameter $K_1$ and the actual output current i of the BBMC, a functional relationship between the optimal finite-time control parameter $K_2$ and the actual output current i of the BBMC, and a functional relationship between the optimal finite-time control parameter $\alpha_1$ and the actual output current i of the BBMC.

(a) The functional relationship between the optimal finite-time control parameter $K_1$ and the actual output current i of the BBMC is expressed as shown in equation (13):

$$f_{K1}(i)=A_1 i^4+A_2 i^3+A_3 i^2+A_4 i+A_5 \quad (13);$$

where $A_1$=4.163×10$^{-5}$, $A_2$=−0.001382, $A_3$=0.01484, $A_4$=0.00125 and $A_5$=0.02925.

(b) The functional relationship between the optimal finite-time control parameter $K_2$ and the actual output current i of the BBMC is expressed as shown in equation (14):

$$f_{K2}(i)=B_1 i^4+B_2 i^3+B_3 i^2+B_4 i+B_5 \quad (14);$$

where $B_1$=0.0004296, $B_2$=−0.01408, $B_3$=0.1537, $B_4$=−0.2423 and $B_5$=0.0802.

(c) The functional relationship between the optimal finite-time control parameter $\alpha_1$ and the actual output current i of the BBMC is expressed as shown in equation (15):

$$f_{\alpha 1}(i)=C_1 \exp(-((i-C_2)/C_3)^2)+C_4 \exp(-((i-C_5)/C_6)^2)+ \\ C_7 \exp(-((i-C_8)/C_9)^2)+C_{10} \exp(-((i-C_{11})^2)+C_{13} \\ \exp(-((i-C_{14})/C_{15})^2) \quad (15);$$

where $C_1$=0.148, $C_2$=11.29, $C_3$=1.84, $C_4$=0.07538, $C_5$=6.413, $C_6$=0.4914, $C_7$=0.07578, $C_8$=2.162, $C_9$=1.123, $C_{10}$=0.08371, $C_{11}$=2.678, $C_{12}$=4.058, $C_{13}$=0.09212, $C_{14}$=7.344 and $C_{15}$=1.663.

The coefficients of the functional relationships corresponding to the optimal finite-time control parameters are obtained using a Matlab™ analysis software according to the least square method; based on the functional relationship between the optimal control parameters and the actual output current of the BBMC, the control parameters are adjusted in real time according to the actual load of the speed regulation system), so that the speed regulation system can achieve an optimal operation effect under any load.

Described above is only a preferred embodiment of the present disclosure. It should be noted that any improvement and variation made by those skilled in the art without departing from the spirit of the present disclosure shall fall within the scope of the appended claims.

What is claimed is:

1. A method for adaptively adjusting control parameters of a Buck-Boost matrix converter (BBMC) based speed regulation system of an asynchronous motor, comprising:
   (1) taking finite-time control parameters as optimization objects, a total harmonic distortion of an output voltage of a BBMC, a deviation signal of a capacitor voltage of the BBMC and a deviation signal of an output current of the BBMC as optimization objectives, establishing a mathematical model between the optimization objects and the optimization objectives for the speed BBMC-based regulation system of the asynchronous motor;
   wherein the mathematical model between the optimization objects and the optimization objectives is established through steps of:
   (1.1) taking a capacitor voltage $u_C$, an inductor current $i_L$ and an output current $i_l$ as control variables of the BBMC-based speed regulation system, establishing a state differential function of the BBMC-based speed regulation system as follows:

$$\begin{cases} \dot{i}_L = \frac{u_C}{L} + \frac{u_C + u_D}{L}d \\ \dot{u}_C = \frac{i_L}{C} - \frac{i_1}{C} - \frac{i_L}{C}d \\ \dot{i}_1 = \frac{i_1 R}{L_1} - \frac{u_C}{L_1} + \frac{u_{DZ}}{L_1} \end{cases} \quad (1)$$

wherein $u_C$ is the capacitor voltage; $i_L$ is the inductor current; $i_l$ is the output current of the BBMC; $u_D$ is the voltage in a DC side of the BBMC; $u_{DZ}$ is the voltage in a common terminal of single-phase stator windings of the asynchronous motor; L and C are respectively the inductance parameter and the capacitance parameter at an inverter side of the BBMC; R and $L_1$ are respectively the equivalent resistance and the equivalent inductance of the single-phase stator windings of the asynchronous motor; and d is the duty cycle of a power switch tube in the BBMC;
   (1.2) obtaining an equation of the duty cycle d of the power switch tube in the BBMC according to the equation (1) and a finite-time control algorithm:

$$d = \frac{(CL_1 u_D(L(-K_1 sat_{\alpha_1}(\lambda_1) + \lambda_1) - K_2(sat_{\alpha_2}(\lambda_2) + \lambda_2)) + u_C u_D) +}{L_1 L_1^2 u_C + CLu_D(u_C + u_D)(Ri_1 - u_C + u_{DZ})} \quad (2)$$

wherein sat is the saturation function;
   $\lambda_1 = (Li_L^2 + C(u_C + u_D)^2 - Li_{Lref}^2 - C(u_{Cref} + u_D)^2)/2$;
   $\lambda_2 = u_D i_L - (u_C = u_D)i_l - u_D i_{Lref} + (u_{Cref} + u_D)i_{lref}$; $u_{Cref}$ is the reference value of the capacitor voltage; $i_{Lref}$ is the reference value of the inductor current; $i_{lref}$ is the reference value of the output current in the BBMC; $K_1$, $K_2$, $\alpha_1$ and $\alpha_2$ are the finite-time control parameters; and $\alpha_2 = 2\alpha_1/(1+\alpha_1)$;
   (1.3) respectively obtaining analytical equations of the output voltage u and the output current $i_l$ according to the equation (1):

$$u = \left(\exp\left(\ln\sqrt{\frac{R^2C - 4L_1}{4L_1 LC}} + \frac{R}{2}\sqrt{\frac{R^2C + 4L_1}{L_1^2 C}}\right) + (1-d)Ri_L\right) \quad (3)$$
$$\left(\cos\left(\sqrt{\frac{R^2C + 4L_1}{4RL_1 LC}}t\right) + \sqrt{\frac{R^2C + 4L_1}{L_1^2 C}}\sin\left(\sqrt{\frac{R^2C + 4L_1}{4RL_1 LC}}t\right)\right),$$

$$i_1 = \left(\exp\left(\ln(2C^2(1-d)i_L) + \frac{1}{2C}\sqrt{\frac{4}{L_1 C} + \frac{R^2}{L_1^2}} + \frac{R}{L_1}\right)\right) \quad (4)$$
$$\left(\frac{R}{L_1}\cos\left(\sqrt{\frac{4}{L_1 C} + \frac{R^2}{L_1^2}}t\right) + \sin\left(\sqrt{\frac{4}{L_1 C} + \frac{R^2}{L_1^2}}t\right)\right);$$

(1.4) obtaining the total harmonic distortion THD of the output voltage u according to a definition of the total harmonic distortion:

$$THD = \frac{\sqrt{\begin{array}{l}(\exp(TH+G) - 2\omega KRi_L d + (R+L_1 H)/(8L_1 \omega^2))^2 + \\ (\exp(TH+G) - 3\omega KRi_L d - (R+L_1 H)/(16L_1 \omega^2))^2\end{array}}}{\exp(TH+G) - \omega KRi_L d - (R+L_1 H)/(2L_1 \omega^2)} \quad (5)$$

wherein $$H = \sqrt{\frac{R^2C + 4L_1}{L_1^2 C}}, K = \sqrt{\frac{R^2C - 4L_1}{4L_1 LC}},$$

G=ln(R/2), T is the period of the output voltage of the BBMC; and ω is the angular frequency of the output voltage; and
   (1.5) respectively obtaining a deviation $\Delta u_c$ between the capacitor voltage $u_c$ and an ideal voltage value $U_e$ under a load and a deviation $\Delta i$ between the output current $i_l$ and an ideal current $I_e$ under a load according to the analytical equations of the output voltage u and the output current $i_l$ obtained from the equation (3) and the equation (4):

$$\Delta u_c = \quad (6)$$
$$u_c - U_e\left(\exp\left(\ln\sqrt{\frac{R^2C - 4L_1}{4L_1 LC}} + \frac{R}{2} - \sqrt{\frac{R^2C + 4L_1}{L_1^2 C}}\right) + (1-d)Ri_L\right)$$
$$\left(\cos\left(\sqrt{\frac{R^2C + 4L_1}{4RL_1 LC}}t\right) + \sqrt{\frac{R^2C + 4L_1}{L_1^2 C}}\sin\left(\sqrt{\frac{R^2C + 4L_1}{4RL_1 LC}}t\right)\right) +$$
$$U_{DZ} - U_e,$$

-continued $$\Delta i = i_1 - I_e = \left( \exp\left( \ln(2C^2(1-d)i_L) + \frac{1}{2C}\sqrt{\frac{4}{L_1C} + \frac{R^2}{L_1^2}} + \frac{R}{L_1} \right) \right) \quad (7)$$

$$\left( \frac{R}{L_1}\cos\left( \sqrt{\frac{4}{L_1C} + \frac{R^2}{L_1^2}}\, t \right) + \sin\left( \sqrt{\frac{4}{L_1C} + \frac{R^2}{L_1^2}}\, t \right) \right) - I_e;$$

(2) arbitrarily selecting a load of the BBMC-based speed regulation system to allow an actual output current of the BBMC to be a value; and establishing, corresponding to the selected load and the actual output current of the BBMC, a multi-objective optimization satisfaction function and a multi-objective optimization fitness function for the BBMC-based speed regulation system;
wherein the multi-objective optimization satisfaction function is established through steps of:
(2.1.1) respectively establishing satisfaction functions of optimization objectives THD, $\Delta u_C$ and $\Delta i$, wherein a satisfaction function $f_1$ of an optimization objective THD is expressed as shown in equation (8):

$$f_1 = \begin{cases} 1 & THD \le THD' \\ \dfrac{c_1}{\sqrt{(THD - THD')}} & THD > THD' \end{cases} \quad (8)$$

a satisfaction function $f_2$ of an optimization objective $\Delta u_C$ is expressed as shown in equation (9):

$$f_2 = \begin{cases} 1 & \Delta u_C \le \Delta u'_C \\ \dfrac{c_2}{\sqrt{(\Delta u_C - \Delta u'_C)}} & \Delta u_C > \Delta u'_C \end{cases} \quad (9)$$

a satisfaction functions $f_3$ of an optimization objective $\Delta i$ is expressed as shown in equation (10):

$$f_3 = \begin{cases} 1 & \Delta i \le \Delta i' \\ \dfrac{c_2}{\sqrt{(\Delta i - \Delta i')}} & \Delta i > \Delta i' \end{cases} \quad (10)$$

wherein THD', $\Delta u_C'$ and $\Delta i'$ are respectively thresholds of the optimization objectives THD, $\Delta u_C$ and $\Delta i$; $c_1$, $c_2$ and $c_3$ are coefficients of satisfaction, wherein $c_1>0$, $c_2>0$ and $c_3>0$; and (2.1.2) establishing the multi-objective optimization satisfaction function $f$ of the optimization objectives THD, $\Delta u_C$ and $\Delta i$ as shown in equation (11):

$$f = k_1 f_1 + k_2 f_2 + k_3 f_3 \quad (11);$$

wherein $k_1$, $k_2$ and $k_3$ are respectively weight coefficients of the optimization objectives THD, $\Delta u_C$ and $\Delta i$; and $k_1 + k_2 + k_3 = 1$; and the multi-objective optimization fitness function is established through steps of:
(2.2.1) comparing satisfaction values of the optimization objectives with corresponding satisfaction thresholds; if a satisfaction value $f_j$ (j=1, 2, 3) of each of the optimization objectives is smaller than a corresponding satisfaction threshold $M_j$ (j=1, 2, 3), the satisfaction value $f_j$ (j=1, 2, 3) is multiplied by a dynamic penalty factor $b_j$, wherein the satisfaction thresholds are respectively $$M_1 = \left| \frac{THD - THD'}{THD} \right|, \quad M_2 = \left| \frac{\Delta u_C - \Delta u'_C}{\Delta u_C} \right| \text{ and } M_3 = \left| \frac{\Delta i - \Delta i'}{\Delta i} \right|;$$

and the corresponding dynamic penalty factors are respectively $$b_1 = \log_{\frac{1}{2}}\left( \left| \frac{THD - THD'}{THD} \right| \right), \quad b_2 = \log_{\frac{1}{2}}\left( \left| \frac{\Delta u_C - \Delta u'_C}{\Delta u_C} \right| \right) \text{ and }$$

$$b_3 = \log_{\frac{1}{2}}\left( \left| \frac{\Delta i - \Delta i'}{\Delta i} \right| \right);$$

otherwise, if the satisfaction value $f_j$ (j=1, 2, 3) of each of the optimization objectives is greater than or equal to its corresponding satisfaction threshold $M_j$ (j=1, 2, 3), setting the dynamic penalty factor $b_j$ as 1;
(2.2.2) establishing the multi-objective optimization fitness function $f_s$ as shown in equation (12):

$$f_s = k_1 b_1 f_1 + k_2 b_2 f_2 + k_3 b_3 f_3 \quad (12);$$

(3) iteratively optimizing, using an adaptive wolf pack optimization algorithm, finite-time control parameters calculated from the multi-objective optimization satisfaction function and the multi-objective optimization fitness function, so that an optimal collaboration among the total harmonic distortion of the output voltage of the BBMC, the deviation signal of the capacitor voltage and the deviation signal of the output current is obtained, thereby obtaining a set of optimal finite-time control parameters corresponding to the selected load and the actual output current of the BBMC; repeating the step (2) and the step (3) to obtain n sets of optimal finite-time control parameters corresponding to n loads and n actual output currents of the BBMC;
wherein the finite-time control parameters in the BBMC are iteratively optimized using the adaptive wolf pack optimization algorithm through steps of:
(3.1) taking the selected actual output current of the BBMC as a judgment reference value of the adaptive wolf pack optimization algorithm;
(3.2) initializing parameters, wherein the parameters comprise: population size N representing N sets of the finite-time control parameters, the maximum number $k_{max}$ of iterations and the multi-objective optimization fitness function $f_s$ representing a concentration S(i) of prey's smell of a wolf pack;
(3.3) configuring a random direction and a random distance of wolves in the wolf pack, and obtaining a position Xi ($K_1$, $K_2$, $\alpha_1$) of the i-th wolf;
(3.4) obtaining the concentration of prey's smell of the wolf pack to obtain a set of the optimization objects; and obtaining the corresponding THD, $\Delta u_C$ and $\Delta i$ according to the optimization objects;
(3.5) identifying a wolf with the highest concentration of prey's smell in the wolf pack as an optimal wolf, and retaining the concentration of prey's smell and position $X_m(K_1, K_2, \alpha_1)$ of the optimal wolf;
(3.6) eliminating N/10 wolves in the wolf pack with a small concentration of prey's smell, and randomly generating the same number of new wolves in a solution space to update the wolf pack;
(3.7) determining whether the maximum number of iterations is reached; if yes, outputting the position $X_m$ ($K_1$, $K_2$, $\alpha_1$) of the optimal wolf to output an optimal solution of the finite-time control parameters $K_1$, $K_2$ and $\alpha_1$; otherwise, adding 1 to the number of iterations, and returning to the step (3.3);

(3.8) determining whether n sets of optimal finite-time control parameters are obtained; if no, changing the actual output current of the BBMC at a certain interval, and returning to the step (3.1); and (3.9) outputting the n sets of optimal finite-time control parameters and the corresponding actual output currents of the BBMC;

(4) obtaining functional relationships between the n sets of optimal finite-time control parameters and the corresponding n loads and n actual output currents of the BBMC using a numerical fitting method;

(5) determining an actual load of the speed regulation system in operation and determining a corresponding actual output current of the BBMC based on the actual load; and (6) adjusting control parameters of the speed regulation system to be optimal finite-time control parameters which are calculated based on the functional relationships from the actual load of the speed regulation system and the corresponding actual output current of the BBMC.

2. The method of claim 1, wherein in the step (4), the numerical fitting method is a least square method; the functional relationships comprise a functional relationship between an optimal finite-time control parameter $K_1$ and the actual output current i of the BBMC, a functional relationship between an optimal finite-time control parameter $K_2$ and the actual output current i of the BBMC, and a functional relationship between an optimal finite-time control parameter $\alpha_1$ and the actual output current i of the BBMC;

wherein the functional relationship between the optimal finite-time control parameter $K_1$ and the actual output current i of the BBMC is expressed as shown in equation (13):

$$f_{K1}(i)=A_1 i^4+A_2 i^3+A_3 i^2+A_4 i+A_5 \quad (13);$$

the functional relationship between the optimal finite-time control parameter $K_2$ and the actual output current i of the BBMC is expressed as shown in equation (14):

$$f_{K2}(i)=B_1 i^4+B_2 i^3+B_3 i^2+B_4 i+B_5 \quad (14);$$

the functional relationship between the optimal finite-time control parameter $\alpha_1$ and the actual output current i of the BBMC is expressed as shown in equation (15):

$$f_{\alpha 1}(i)=C_1 \exp(-((i-C_2)/C_3)^2)+C_4 \exp(-((i-C_5)/C_6)^2)+C_7 \exp(-((i-C_8)/C_9)^2)+C_{10}\exp(-((i-C_{11})^2)+C_{13}\exp(-((i-C_{14})/C_{15})^2) \quad (15);$$

wherein $f_{K1}(i)$, $f_{K2}(i)$ and $f_{\alpha 1}(i)$ are respectively functions of the optimal finite-time control parameters $K_1$, $K_2$ and $\alpha_1$; $A_1$, $A_2$, $A_3$, $A_4$ and $A_5$ are respectively coefficients of $f_{K1}(i)$; $B_1$, $B_2$, $B_3$, $B_4$ and $B_5$ are respectively coefficients of $f_{K2}(i)$; $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$ and $C_{15}$ are respectively coefficients of $f_{\alpha 1}(i)$; and the coefficients are obtained using Matlab™ analysis software according to the least square method; and the optimal finite-time control parameters corresponding to any load of the BBMC-based speed regulation system are determined according to the obtained functional relationships.

* * * * *